No. 744,617. PATENTED NOV. 17, 1903.
E. RITSERT.
CLOSING BOTTLES OR VESSELS.
APPLICATION FILED AUG. 28, 1903.
NO MODEL.

Witnesses

Inventor
Eduard Ritsert

By Foster, Freeman & Watson,
Attorneys

No. 744,617.      Patented November 17, 1903.

UNITED STATES PATENT OFFICE.

EDUARD RITSERT, OF FRANKFORT-ON-THE-MAIN, GERMANY.

CLOSING BOTTLES OR VESSELS.

SPECIFICATION forming part of Letters Patent No. 744,617, dated November 17, 1903.

Application filed August 28, 1903. Serial No. 171,152. (No model.)

*To all whom it may concern:*

Be it known that I, EDUARD RITSERT, a subject of the German Emperor, residing and having my post-office address at 75 Gutleutstrasse, Frankfort-on-the-Main, Germany, have invented certain new and useful Improvements in Closing Bottles or Vessels, of which the following is a specification.

This invention relates to means for closing vessels containing sterilized matters or matters to be protected from germs or contamination, such as liquids intended for subcutaneous injections.

The closing device according to this invention is so contrived that when the vessel is in the form of a syringe the said device need not be removed when the syringe is to be filled, but only requires to be punctured and the syringe dipped into the liquid, which is then drawn into the syringe without germs or contamination passing in with the liquid.

The invention can be carried out as follows: A disk of india-rubber or other elastic material is applied to the mouth of the vessel containing the liquid or matter in a heated condition. As the liquid cools down the vacuum produced in the vessel causes the india-rubber or like disk to be pressed tightly on the rim or edge of the mouth of the vessel.
As the said disk does not extend over the said rim or edge, it is necessary in order to prevent it being accidentally displaced to place thereover a flexible cap formed, preferably, of animal membrane moistened and drawn over the said rim or edge and kept thus drawn during the subsequent sterilization by a hoop passed over it. After the cooling the hoop may be removed. The said cap of membrane adheres firmly to the vessel. Before the said membrane is applied a layer of sterilized wadding or other substance acting as a filter may be laid on the disk of elastic material, such wadding or other filtering material preventing germs or contamination entering the vessel with any air that may enter. The membrane may be laid on the mouth of the vessel before it is heated; but in this case it should be provided with an outlet closing as a valve during cooling, so as to press firmly on the disk beneath or on the rim or edge of the vessel.

The invention is illustrated in the accompanying drawings, in which—

Figure 1:
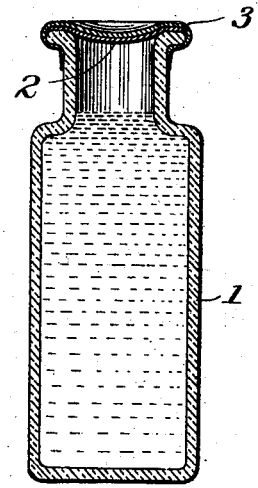
Figure 2:
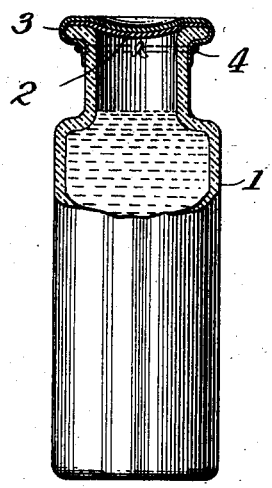
Figure 3:
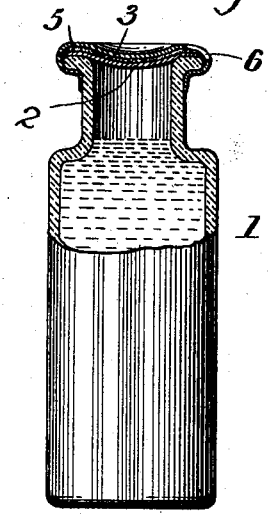
Figure 4:
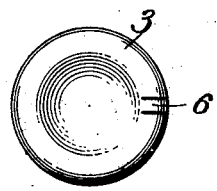

Figure 1 is a vertical sectional view through a liquid-receptacle having its mouth closed in accordance with the invention above described. Fig. 2 is a view illustrating one step in the process followed in applying the cover to the vessel. Fig. 3 illustrates a modification of the invention, and Fig. 4 is a plan view of Fig. 3.

Referring to the drawings, 1 designates the liquid receptacle or vessel, which is shown as made in the form of a bottle. In accordance with the present invention the mouth of the vessel 1 is closed by a thin elastic disk 2, india-rubber being preferably employed, which disk 2 is held in position by a cap 3, preferably of animal membrane. As stated above, the membrane cap is moistened before being stretched over the mouth of the vessel and the disk 2 thereon, and it can be temporarily secured in such position by means of a fastening band or hoop 4. This band or hoop can be removed after sterilizing the contents of the vessel, as the outer disk will adhere firmly to the walls of the vessel.

If desired, a layer or body of suitable filtering material 5 may be placed over the disk 2 before applying the outer membrane, which material will act as a filter for any air that may be drawn into the vessel.

In case the cap 3 is applied to the vessel before the contents are fully heated it is provided with a means for permitting the escape of air from between the disk and cap and of closing to prevent the entrance of air when the contents become cool. This can be accomplished by making suitable incisions in said membrane to provide a small flap 6, which, together with the edges of the slits separating it from the body of the cap, will be drawn close against the rim of the mouth of the vessel 1 as the contents thereof cool and produce a partial vacuum in the vessel.

Having now particularly described and ascertained the nature of the said invention and in what manner the same is to be performed, I declare that what I claim is—

1. The combination with a receptacle, of an elastic disk arranged over the mouth of the receptacle, and a flexible cap fitted over said disk and the mouth of the receptacle and holding the disk in place.

2. The combination with a receptacle, of an india-rubber disk arranged over the mouth of the receptacle, and a cap formed of animal membrane, or similar material, fitted over said disk and the mouth of the receptacle to hold the disk in place and hermetically seal the receptacle.

3. The combination with a receptacle, of a stopper or closing device for the mouth of said receptacle including an inner disk of elastic material, an intermediate body of sterilized filtering material, and an outer cap fitted over the mouth of the receptacle for holding said disk and filtering material in position and hermetically sealing the receptacle.

4. The combination with a receptacle, of a stopper or closing device including a disk arranged over the mouth of the receptacle, and a flexible cap fitted over said disk and the mouth of the receptacle and having a section of the top thereof partly separated from its body, whereby said section is adapted to permit the escape of air from beneath said cap but will be drawn against the edge of the mouth of the receptacle as the other parts of the top of the cap are drawn inwardly with the other portions of the top of the cap to hermetically seal the receptacle when a partial vacuum is formed therein.

In testimony whereof I have signed my name to this specification in the presence of two subscribing witnesses.

EDUARD RITSERT.

Witnesses:
FRANZ HASSLACHER,
MICHAEL VOLK.